United States Patent [19]

Belder et al.

[11] 4,299,742
[45] Nov. 10, 1981

[54] ALKYDS

[75] Inventors: Eimbert G. Belder; John C. Legg; Robert van der Linde, all of Zwolle, Netherlands

[73] Assignee: Internationale Octrooi Maatschappij "OCTROPA" B.V., Rotterdam, Netherlands

[21] Appl. No.: 117,955

[22] Filed: Feb. 4, 1980

Related U.S. Application Data

[63] Continuation of Ser. No. 914,865, Jun. 12, 1978, abandoned.

[30] Foreign Application Priority Data

Jun. 13, 1977 [GB] United Kingdom ............... 24562/77
Mar. 22, 1978 [GB] United Kingdom ............... 11379/78

[51] Int. Cl.$^3$ ................................................ C09D 3/64
[52] U.S. Cl. ............................ 260/22 EP; 260/22 M; 260/22 R
[58] Field of Search ............. 260/22 EP, 22 M, 22 R

[56] References Cited

U.S. PATENT DOCUMENTS

| | | | |
|---|---|---|---|
| 2,634,245 | 4/1953 | Arnot | 260/22 R |
| 3,001,961 | 9/1961 | Armitage et al. | 260/22 M |
| 3,223,659 | 12/1965 | Curtice et al. | 260/22 M |
| 3,280,057 | 10/1966 | Campagna | 260/22 CQ |
| 3,297,605 | 1/1967 | Schroeder et al. | 260/22 R |
| 3,379,548 | 4/1968 | Jen | 260/22 R |
| 3,437,618 | 4/1969 | Taft | 260/22 M |
| 4,051,089 | 9/1977 | Tobias et al. | 260/22 R |

FOREIGN PATENT DOCUMENTS

| | | |
|---|---|---|
| 2455896 | 6/1975 | Fed. Rep. of Germany . |
| 2622646 | 2/1977 | Fed. Rep. of Germany . |
| 2253057 | 6/1975 | France . |
| 999062 | 7/1965 | United Kingdom . |
| 1013933 | 12/1965 | United Kingdom . |
| 1038696 | 8/1966 | United Kingdom . |
| 1044821 | 10/1966 | United Kingdom . |
| 1061941 | 3/1967 | United Kingdom . |
| 1090593 | 11/1967 | United Kingdom . |
| 1225059 | 3/1971 | United Kingdom . |
| 1383967 | 2/1975 | United Kingdom . |
| 1455224 | 11/1976 | United Kingdom . |

OTHER PUBLICATIONS

Kittel, Lehrbuch DeLacke and Beschichtungen, vol. 1, Part 3, p. 911 (1974).

Primary Examiner—Ronald W. Griffin
Attorney, Agent, or Firm—Barry Kramer

[57] ABSTRACT

The invention provides novel water-dispersible air-drying alkyds containing 1.25–3.75% by weight of polyalkylene oxide radicals, in particular polyethylene glycol, and novel aqueous dispersions of these alkyds (alkyd : water from 30:70 to 70:30) which can be worked into water-based paints having a glossy finish.

4 Claims, No Drawings

ALKYDS

This is a continuation of application Ser. No. 914,865, filed June 12, 1978, now abandoned.

This invention relates to alkyds, more in particular to water-dispersible, air-drying alkyd resins suitable for the preparation of aqueous alkyd dispersions including water-based paints with a gloss finish.

Water-based paints having a gloss finish have been known for some time. Water-dispersibility of the alkyds which constitute the resin of these paints has been conferred generally by including in the alkyd an alkylene oxide addition product such as polyethylene glycol in an amount of at least 9% by weight of the alkyd resin. This amount of alkylene oxide addition product, whilst considered necessary to obtain water-dispersibility and a gloss finish, also caused the paint films obtained therefrom to be soft and to have a poor water-resistance. Attempts have been made to improve the quality of the coating e.g. by the introduction of a vinylic monomer such as styrene, but the results have not been entirely satisfactory, especially not as regards water-resistance, gloss and hardness of the coatings obtained.

It has now been found that novel water-dispersible air-drying alkyds can be obtained by building into an alkyd 1.25–3.75% by weight of polyalkylene oxide radicals. These novel alkyds can be dispersed in water so as to form stable dispersions useful in the preparation of water-based paints.

By the term alkyd resin is to be understood a polyester product composed by polyhydric alcohols, polybasic acids and monobasic fatty acid (cf. Encyclopedia of Polymer Science and Technology, Vol. 1, page 663, Interscience New York). In the case of air-drying alkyd, a substantial amount of the fatty acids are polyunsaturated.

Particularly suitable alkyds are based on a drying oil or suitable unsaturated fatty acids, a polyol, an aromatic and/or aliphatic polycarboxylic acid and an alkylene oxide addition product in which the (semi) drying oil component or unsaturated fatty acids constitute(s) 45–80, preferably 55–65 weight percent of the mixture, the polyol component constitutes 10–30, preferably 12–25 weight percent of the mixture, the polycarboxylic acid component constitutes 10–35, preferably 12–25 weight percent of the mixture, the alkylene oxide addition product constitutes 1.25–3.75, preferably 1.5 or rather 1.75–2.75 weight percent of the mixture, and the relative amounts of polyol, drying or semi-drying oil and carboxylic acid are chosen in such a way as is usual in the manufacture of (semi) air-drying alkyd resins to be used in solvent-based paint. Especially alkyds having an acid value of 5–20 mg KOH/g and a hydroxyl value of 5–125 mg KOH/g can be used successfully and alkyds having an acid value of 7–14 and hydroxyl value of 10–75 are preferred. It is surprising that with these low amounts of alkylene oxide addition products water-dispersible alkyds suitable for obtaining glossy paints could be obtained.

The esterification reaction leading to the alkyd resin is conveniently carried out at a temperature of 180°–260° C., whilst removing water or any other volatiles of reaction. The addition to the reaction mixture of an entrailment agent such as xylene for the removal of water by azeotropic distillation is preferred. The reaction is optionally carried out in the presence of a catalyst. Suitable catalysts are e.g. metal oxides, especially of the alkaline earth metals, in quantities of $(1–10)\times 10^{-5}$ of the reaction mixture.

Sometimes it is advantageous to carry out the reaction in two steps, viz. an alcoholysis reaction of the drying oil with the polyol, followed by esterification with the carboxylic acid and alkylene oxide addition product.

As drying oil component any of the drying or semi-drying oils can be used; also fatty acids derived therefrom and other suitable unsaturated fatty acids, such as tall oil fatty acids, can be used. Suitable oils are e.g. linseed oil, soyabean oil, perilla oil, safflower oil and dehydrated castor oil. Modified (semi) drying oils such as e.g. styrenated oils or isocyanate modified oils can also be used. Suitable styrenated oils can be prepared by the addition of styrene to the oil at 140°–160° C. for a period of several hours until a suitable viscosity has been reached.

As polyol any alcohol having 2–6 hydroxyl groups and 3–10 carbon atoms can be used. In general at least 50% of the polyol should contain at least 3 hydroxyl groups in the molecule. Suitable alcohols are e.g. glycol, glycerol, trimethylol alkanes containing 1–3 carbon atoms in the alkane group, pentaerythritol, etc. These alcohols may also contain a smaller amount of higher oligomeric forms, such as e.g. dipentaerythritol.

As polycarboxylic acid any acid containing 2–4 carboxyl groups and 3–9 carbon atoms in the molecule can be used. These acids may be aliphatic, aromatic or cycloaliphatic. Dicarboxylic acids are generally preferred as the major acid constituent. Suitable acids are the phthalic acids, maleic acids, fumaric acids, azelaic acid, sebacic acid, trimellitic acid, pyromellitic acid etc.

As polyalkylene oxide compound any compound having the structure of a number of $C_2$–$C_4$ alkylene oxide units attached to a $C_1$–$C_6$ mono- or poly-hydroxy compound can be used, including the addition products of partial ethers of polyhydroxy compounds.

The average molecular weight of the alkylene oxide addition product, which preferably is an ethylene oxide addition product, in particular polyethylene glycol, should range from 200 to 6000, preferably from 1000 to 3000. Polyethylene glycol is a preferred compound. Certain ethylene oxide addition products are sold under the tradename of Carbowax (ex Union Carbide Co.).

The novel alkyd resins obtained upon esterification of the above components are yellow-brown semi-solid resins usually having a Gardner colour of 4–8, and can be worked into a stable aqueous dispersion. The alkyd resin is optionally diluted with a minor amount of an organic solvent of the alcohol type such as a $C_2$–$C_6$ mono- or diol, e.g. tutanol, ethylene glycol, propylene glycol or a half ether thereof in an amount of 0–10%, preferably 0–5% by weight. The solvent, if any, is added after cooling the alkyd to a temperature of 60°–150° C., dependent on the nature of the solvent. Whether or not a solvent is used depends, inter alia, on the viscosity of the alkyd.

The alkyd is then dispersed in water, using alkyd and water in weight ratios of 30:70 to 70:30, preferably demineralised water at a temperature of 20–100, preferably 50°–90° C. in the presence of 0.25–5, preferably 1–3 weight percent of an emulsifying agent and 0.05–5 weight percent of a volatile water-soluble base, preferably an amine.

The exact amount of base added is such that the final pH of the dispersion ranges between 5 and 9.

Preferably the dispersion is prepared by means of a high speed dissolver, such as a Cowless disperser. The emulsifying agent and the amine are previously dissolved in the aqueous phase. The emulsifying agent is preferably of the nonionic or anionic type or a combination thereof. Certain combinations of a nonionic and an anionic yield excellent results. In the case of a nonionic an ethylene oxide addition product of a $C_{12}$–$C_{20}$ hydroxy or carboxyl compound carrying 2–50, preferably 4–20 ethylene oxide groups in the molecule, is preferably used; in case an anionic is used, an alkali metal $C_{10}$–$C_{22}$ soap, a sulfo-succinate or an inorganic $C_{10}$–$C_{22}$ alkyl ether ester such as a sulphate or phosphate is perferred. The volatile base, in particular water-soluble amino-compound used is preferably a $C_1$–$C_6$ amine or alkanolamine and the amount of amine is so chosen that at least 30 equivalent percent, perferably at least 50 eq. % of the carboxyl groups of the alkyd (as evidenced by its acid value) is neutralized and the final pH of the dispersion ranges between 5 and 9.

By this process a novel aqueous dispersion of alkyd in water is obtained containing 30–70 weight percent of alkyd and 70–30 weight percent of water, preferably 50–70 weight percent of alkyd, 50–30 weight percent of water, 0.25–5 weight percent of emulsifying agent and 0.05–5 weight percent of a volatile base. The average particle size of the dispersed alkyd may range between 0.5 and 15 microns. Thus dispersions can be obtained which are generally stable upon storage for at least 6 weeks at 50° C.

A water-based paint or like coating composition comprising a water-dispersible alkyd resin as described above, dispersed as a substantially stable emulsion in an aqueous medium with one or more finely divided pigment fillers, extenders and drying agents finely divided therein and capable of yielding a glossy coating can thus be obtained. The stable alkyd emulsion is thus a starting material in the preparation of water-based paints.

The pigment fillers, extenders, drying agents and other adjuncts can be added directly to the aqueous dispersion of the alkyd but it is generally preferred first to prepare a pigment paste and to incorporate this paste into the aqueous dispersion of the alkyd.

If such a pigment paste is to be prepared, a dispersant and/or wetting agent, water and optionally an at least partially water-soluble solvent such as a glycol and a thickening agent/protective colloid are ground together until homogeneous. The pigment content generally ranges between 33 and 66 parts by weight, the solvent content from 0–10 parts by weight and the wetting agent/dispersant from 2–10 parts by weight. In cases where high amounts of pigments are used it may be difficult to obtain a glossy finish.

The pigment paste thus obtained is then dispersed in the aqueous dispersion of the alkyd by means of a high speed disperser or a similar device. The aqueous dispersion of the alkyd may be present in 100 to 200 parts by weight, small amounts in the order of magnitude of a few percent of one or more defoamers, a thickening agent and a few percent (calculated as free metal) of a drying agent, which is a mixture of metal salts such as cobalt, calcium and lead salts e.g. naphthenates in an organic solvent. Dispersing is continued until a fine dispersion has been obtained.

The water-based air-drying coating composition thus obtained is capable of drying to non-tack in 2–6 hours, yielding a gloss finish, dependent on the pigment content, which is water-resistant and hard.

EXAMPLES 1–7

A. Preparation of the modified air-drying alkyds

A 3-liter, 4-necked reaction vessel equipped with a stirrer, a gas inlet tube, a thermometer and a Dean and Stark apparatus connected to a condensor was charged with drying oil and/or fatty acid, polyol and calcium hydroxide as indicated in Table 1 and subsequently heated to 250° C. under a nitrogen blanket, until alcoholysis was complete (checked by complete solubility of a sample in ethanol). The mixture was then cooled to about 200° C. and the acid anhydride, polyalkylene oxide addition compound (Carbowax 1540) and xylene were added.

The contents of the flask were heated to 240°–245° C. while distilling off the reaction under azeotropically and maintained at this temperature until a sample of the resin had the indicated acid value and viscosity. See Table 1.

B. Preparation of the emulsions

The resin obtained as described under A was cooled to 140° C. and added over a period of 1.5 h. to an aqueous phase having a temperature ranging from 50°–90° C., which contained the emulsifiers and base as indicated in Table 2. Stirring was effected by means of a Cowles-type disperser.

The dispersions thus obtained showed after 24 hours the characteristics as tabulated in Table 2.

C. Preparation of paints

In a liter tin the pigment was dispersed in water together with dispersants and a protective colloid.

Subsequently, the alkyd emulsion and the driers were added. If necessary an antifoam agent and/or a thickening agent may be added. The paint composition and the paint properties are listed in Table 3.

TABLE 1

| | Raw material | Resin composition Examples 1–7 (grams) | | | | | | |
|---|---|---|---|---|---|---|---|---|
| | | 1 | 2 | 3 | 4 | 5 | 6 | 7 |
| Alcohol-ysis | Soy bean oil | 464 | 1086 | 715 | 1138 | — | — | 1190 |
| | Linseed oil | — | — | 477 | — | 333 | 1515 | — |
| | Safflower oil | 469 | — | — | — | 1000 | — | — |
| | Tall oil fatty acid | — | — | — | 272 | — | — | — |
| | Glycerol | 106 | — | 72 | 30 | 11 | — | 75 |
| | Pentaerythritol | — | 206 | 204 | 193 | 223 | 180 | 200 |
| | Trimethylolpropane | 313 | — | — | — | — | — | — |
| | Calciumhydroxide | 0.1 | 0.1 | 0.1 | 0.1 | 0.1 | 0.1 | 0.1 |
| Esterification | Phthalic anhydride | 663 | 535 | 510 | 196 | 421 | 330 | 510 |
| | Maleic anhydride | — | — | — | — | 14 | — | — |
| | Isophthalic acid | — | — | — | 217 | — | — | — |
| | Trimethylolpropane | — | 146 | — | — | — | — | — |
| | Carbowax 1540 | 60 | 39 | 39 | 40 | 40 | 41 | 40 |
| | Xylene | 40 | 40 | 40 | 40 | 40 | 40 | 150* |

TABLE 1-continued

| | Raw material | Resin composition Examples 1-7 (grams) | | | | | | |
|---|---|---|---|---|---|---|---|---|
| | | 1 | 2 | 3 | 4 | 5 | 6 | 7 |
| Proper- | Acid value (mg KOH/g) | 9.4 | 12.3 | 8.4 | 8.0 | 8.8 | 9.0 | 6.6 |
| ties | Hydroxyl value (mg KOH/g) | 44.6 | 60.9 | 41.5 | 12.2 | 23.9 | 22.8 | 42.1 |
| | Viscosity, mPaS, 70% in White Spirit, 20° C./Emila | 3200 | 9200 | 6000 | 250 | 7000 | 80 | 3500 |

*styrene

TABLE 2

(Examples E-1a–E7)
Emulsion compositions in grams

| | E-1a | E-1b | E-2 | E-3a | E-3b | E-3c | E-4 | E-5 | E-6 | E-7 |
|---|---|---|---|---|---|---|---|---|---|---|
| Water | 390 | 390 | 390 | 390 | 390 | 390 | 390 | 390 | 390 | 320 |
| Triethylamine | | | | | | | 7 | 7 | | |
| Dimethylethylamine | 4 | 4 | 4 | 4 | | 3 | | | 5 | 3 |
| Ammonia | | | | | 5 | | | | | |
| AMP-90 (1) | | 5 | | | | | | | | |
| NNP-4 (2) | | | | | | | | 4 | | |
| NNP-20 (2) | 7.5 | | 10 | 10 | 10 | | 7 | 7 | 7 | 7 |
| NNP-30 (2) | | | | ~ | | | 3 | | | |
| APEP- (3) | 2.5 | | | | | | | | | 3 |
| Fatty alcohol EO (4) | | 10 | | | | | | | | |
| Fatty acid EO (5) | | | | | | | 3 | | | |
| Ethyleneoxide homopolymer (6) | | 3 | | 3 | | | | 3 | | |
| Sulfosuccinate (7) | | | | | | 1.25 | | | | |
| Polyvinylalcohol (8) | | | 3 | | 3 | | 3 | | 4 | |
| Alkyd resin 1 | 500 | 500 | | | | | | | | |
| Alkyd resin 2 | | | 500 | | | | | | | |
| Alkyd resin 3 | | | | 500 | 500 | 500 | | | | |
| Alkyd resin 4 | | | | | | | 500 | | | |
| Alkyd resin 5 | | | | | | | | 500 | | |
| Alkyd resin 6 | | | | | | | | | 500 | |
| Alkyd resin 7 | | | | | | | | | | 500 |
| pH of emulsion | 6.5 | 7.0 | 6.4 | 5.9 | 7.1 | 6.4 | 6.4 | 5.4 | 5.9 | 5.7 |
| Viscosity 23° C. mPaS (9) | 3070 | 3080 | 530 | 9 | 2000 | 110 | 1320 | 340 | 310 | 790 |
| Solids content % (ww) | 54.5 | 55.7 | 54.6 | 55.2 | 55.6 | 55.2 | 55.0 | 55.6 | 60.4 | 58.2 |

(1) 2-methyl-2 aminopropanol-1 90% in water
(2) ethoxylated nonyl phenols with different percentages EO, Antarox ex General Anilin & Film Corp.
(3) alkylphenol ether phosphate Servoxyl-VPNZ$^4$/10 ex Servo B.V.
(4) ethyleneoxide addition product of fatty alcohols Mulgophen ON-870 ex General Anilin & Film Corp.
(5) ethyleneoxide addition product of fatty acids Servirox OEG 55 ex Servo B.V.
(6) ethyleneoxide homopolymer of high molecular weight ex Union Carbide Co.
(7) sulfosuccinate Aerosol-501 ex American Cyanamid Co.
(8) polyvinyl alcohol ester value 140, acetyl value 10.7 ex Hoechst
(9) determined with Rheomat, Cup C, position 15

TABLE III

Paint composition Examples 1a-7

| | P-1a | P-1b | P-2 | P-3a | P-3b | P-3c | P-4 | P-5 | P-6 | P-7 |
|---|---|---|---|---|---|---|---|---|---|---|
| Calgon S (1) | 10 | 10 | 10 | 10 | 10 | 10 | 10 | 10 | 10 | 10 |
| Borchiset WL (2) | 3 | 3 | 3 | 3 | 3 | 3 | 3 | 3 | 3 | 3 |
| Collacral VL (3) | 74 | 74 | 74 | 74 | 74 | 74 | 74 | 74 | 74 | 74 |
| Water | 39 | 39 | 39 | 39 | 39 | 39 | 39 | 39 | 93 | 39 |
| Titanium dioxide (4) | 227 | 227 | 227 | 227 | 227 | 227 | 227 | 227 | 227 | 227 |
| Nopeo NXZ (5) | 1 | 1 | 1 | 1 | 1 | 1 | 1 | 1 | 1 | 1 |
| Emulsion E-1a (of Table 2) | 648 | | | | | | | | | |
| Emulsion E-1b | | 648 | | | | | | | | |
| Emulsion E-2 | | | 648 | | | | | | | |
| Emulsion E-3a | | | | 648 | | | | | | |
| Emulsion E-3b | | | | | 648 | | | | | |
| Emulsion E-3c | | | | | | 648 | | | | |
| Emulsion E-4 | | | | | | | 648 | | | |
| Emulsion E-5 | | | | | | | | 648 | | |
| Emulsion E-6 | | | | | | | | | 594 | |
| Emulsion E-7 | | | | | | | | | | 648 |
| Aqua Trockner 123 (6) | 15 | 15 | 15 | 15 | 15 | 15 | 15 | 15 | 15 | 15 |
| Borchigel L75 (7) | 37 | 37 | 37 | 37 | 37 | 37 | 37 | 37 | 37 | 37 |
| Gloss (Gardner 20°) | 72 | 71 | 70 | 78 | 76 | 72 | 75 | 15 | 73 | 77 |
| Sand-dry time (hrs) | 5.0 | 5.0 | 3.5 | 3.0 | 3.5 | 3.0 | 6 | 4.5 | 4.0 | 3.0 |

TABLE III-continued

| | Paint composition Examples 1a–7 | | | | | | | | | |
|---|---|---|---|---|---|---|---|---|---|---|
| | P-1a | P-1b | P-2 | P-3a | P-3b | P-3c | P-4 | P-5 | P-6 | P-7 |
| Water resisance | o.k. | o.k. | o.k. | o.k. | o.k. | o.k. | o.k. | o.k. | o.k. | o.k. |

Legend:
(1) Sodiumpolymetaphosphate 5% in water
(2) Trialkylphosphate (ex Borchers)
(3) N-vinyl-pyrrolidone copolymer (ex BASF)
(4) Kronos RN-59
(5) Foam depressant (silicon-free)
(6) 1.2% Co, 7.2% Ba, 3.2% Zn salt (as octanoates) (ex Borchers)
(7) nonionic thickening agent based on polyurethane; 50% in water (ex Borchers)

We claim:
1. An aqueous dispersion comprising:
an air drying alkyd containing from 1.5 to 2.75 weight percent of polyoxyalkylene radicals, said alkyd having an acid value of from 5 to 20 mg KOH/g and a hydroxyl value of from 5 to 125 mg KOH/g, the wieght ratio of alkyd to water being from 30:70 to 70:30, a non-ionic emulsifying agent in an amount of from 0.25 to 5% by weight, based on the dispersion; a $C_2$–$C_6$ alcohol in an amount of from 0 to 10% by weight based on the dispersion; and a volatile water-soluble base in an amount of from 0.5 to 5% by weight, based on the dispersion; said dispersion having a pH ranging between 5 and 9.

2. A dispersion as claimed in claim 1, in which the alkyd has an acid value of from 7 to 14 mg KOH/g and a hydroxyl value of from 10 to 75 mg KOH/g.

3. A dispersion according to claim 1 in which the emulsifying agent is the ethylene oxide addition product of a $C_{12}$–$C_{20}$ hydroxyl or carboxyl compound having an average of from 2 to 50 ethylene oxide groups in the molecule.

4. A dispersion according to claim 1, in which the base is a water-soluble volatile amino compound.

* * * * *